Figure 1:
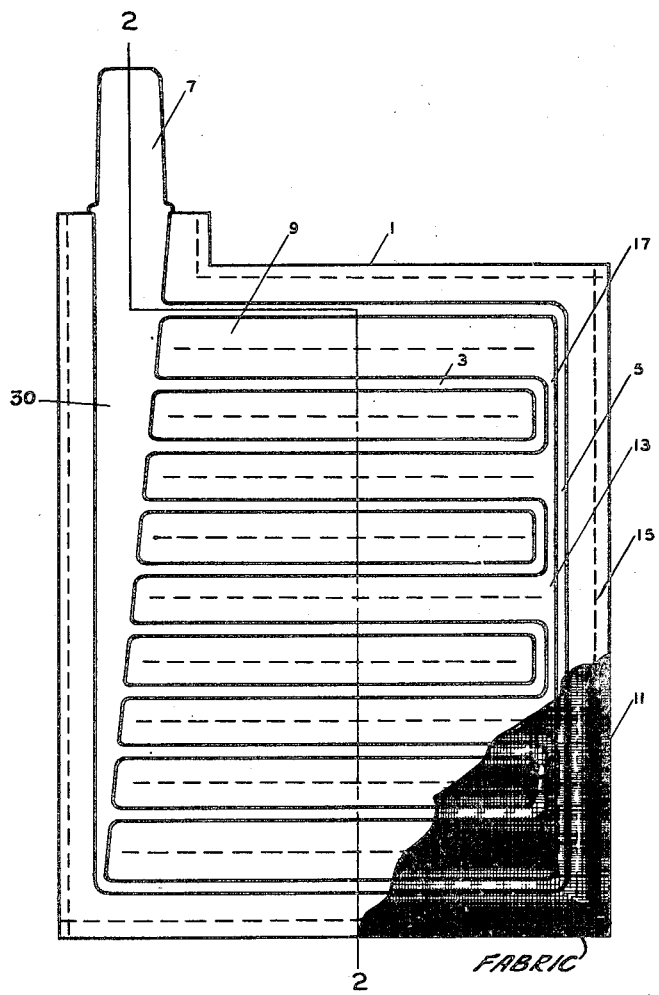

July 18, 1950   L. EVANS   2,515,204
STORAGE BATTERY PLATE

Filed Nov. 1, 1944   2 Sheets-Sheet 1

Llewellyn Evans
INVENTOR

BY Arthur L. Davis
ATTORNEY

July 18, 1950          L. EVANS          2,515,204

STORAGE BATTERY PLATE

Filed Nov. 1, 1944          2 Sheets-Sheet 2

Lewellyn Evans
INVENTOR

BY Arthur L. Davis

ATTORNEY

Patented July 18, 1950

2,515,204

UNITED STATES PATENT OFFICE 2,515,204

STORAGE BATTERY PLATE

Llewellyn Evans, Chattanooga, Tenn., assignor to Tennessee Valley Authority, a corporation of the United States of America Application November 1, 1944, Serial No. 561,463

5 Claims. (Cl. 136—36)

(Granted under the act of March 3, 1883, as amended April 30, 1928; 370 O. G. 757)

The invention herein described may be manufactured and used by or for the Government for governmental purposes without the payment to me of any royalty thereon.

This invention relates to improved plates for storage batteries, particularly those involving the use of pasted active material in contact with conductors.

The usual method of making a storage battery plate consists in casting a grid, or otherwise making a metal, windowlike frame having many openings, provided with a terminal riser, and filling each opening of the grid with a paste of the active material of the battery, such as lead peroxide for a positive plate or sponge lead for a negative plate. An appropriate number of alternate positive and negative plates are assembled with separators between adjacent plates; the terminal riser of all the plates of similar polarity is connected to a metal crossbar and this crossbar in turn is connected to an external terminal which is usually sealed into an appropriate case or jar. A suitable electrolyte such as sulfuric acid of proper concentration covers the plates so assembled.

A variation in plate construction includes the use of the active paste material arranged in the form of pencils on the vertical parts of the heavy supporting grid. It has been proposed to use glass fabric as a separator between the positive and negative plates of a standard grid, or as a material for retaining active material in pencil form when such construction is used. However, neither of these applications generally has had any effect in the reduction of the amount and corresponding weight of metal required to form the grid or the pencil cores and their associated manifolds.

The principal object of the present invention is to provide storage battery plates from which there can be constructed a storage battery with fewer plates of smaller weight and volume for the corresponding capacity of plates as presently constructed. Another object of this invention is to provide a flexible plate construction which eliminates troubles due to buckling of plates, and thereby provide a battery which has a longer life and can withstand more severe service. A further object of this invention is to provide a storage battery plate which can be easily constructed in order to prevent the active material from separating from the plate, thereby producing a battery of considerably longer life. Other objects of this invention include the provision for construction of a plate which does not have an exposed header, or headers, for conducting currents to or from the conducting elements immediately in contact with the active material, thereby protecting the plate from corrosion which ordinarily reduces the life of such exposed outside surfaces of grid plates, or requires an excessive amount of metal to be present to compensate for corrosion which may occur.

The storage battery of the present invention comprises the combination of conducting elements forming an interconnected grid, active material around the respective conducting elements, and porous, electrolyte resistant fabric extending over the lateral surfaces of active material on the grid and united around and between the elements of the grid to form a continuous, interconnected grid chamber enclosing the grid and the active material supported thereon.

Figure 2:
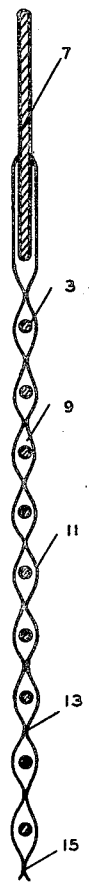
Figure 4:
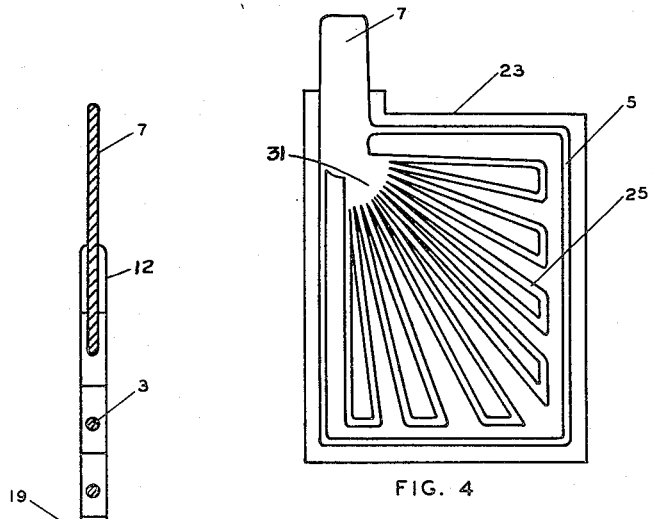
Figure 3:
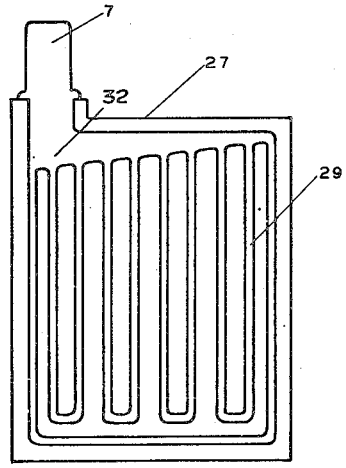
Figure 5:
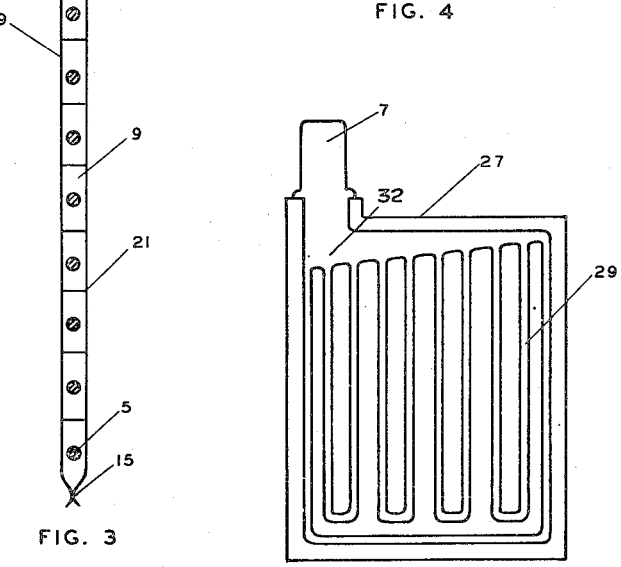

In the accompanying drawing which forms a part of the specification and wherein the reference symbols refer to like parts wherever they occur, Fig. 1 is a partial, vertical, sectional view of one form of storage battery plate showing the embodiment of the present invention, Fig. 2 is a vertical, transverse, sectional view through 2—2 of Fig. 1, Fig. 3 is a vertical, transverse, sectional view through 2—2 of Fig. 1, showing another embodiment of the present invention wherein the body of the plate has a substantially uniform thickness, Fig. 4 is a vertical, sectional view of another embodiment of the present invention, particularly in respect to the grid, and Fig. 5 is a vertical, sectional view of still another form of embodiment of the present invention showing a further variation in arrangement of the grid elements.

In Fig. 1 and Fig. 2, the storage battery plate 1 contains conducting elements distributed therethrough, represented by horizontally conducting elements 3 and a vertically conducting element 5 in a looped configuration and arranged in the form of a grid. These elements are connected, the grid completed, and so arranged as to provide a terminal 7, the lower portion of which forms terminal header 30 and is an appropriate size for conducting current to and from elements of various distances from the terminal proper. Each of the conducting elements is surrounded by active material 9 and this active material and the enclosed grid are covered by a porous electrolyte resisting fabric 11 made of borosilicate glass (Pyrex) fibers extending over the lateral surfaces of the active material on the grid and united by sewing or using electrolyte resistant cement to form seams between the conducting elements in zones represented by 13 and around the external conducting element as represented by 15 to form a continuous, interconnected grid chamber 17 enclosing the grid and the active material supported thereon.

In Fig. 3, the storage battery plate 19, the vertical section of which is substantially identical in appearance to Plate 1 shown in Fig. 1, has electrolyte resisting fabric 12 united between the conducting elements in zones represented by 21 so as not to constrict appreciably the active material between elements 3, thereby forming a plate of substantially uniform thickness. Fig. 3 illustrates the intermediate sewing of the fabrics covering the external faces of a plate without the application of sufficient pressure to cause both fabrics to come into close juxtaposition in contradistinction to Fig. 2, where close juxtaposition is provided.

In Fig. 4, storage battery plate 23 is shown with a grid which includes a plurality of radially extending members 25. In Fig. 5, storage battery plate 27 is shown with the grid including vertically extending members 29. The fabric on both sides of the plates shown in Fig. 3 and Fig. 4 is united around and between the conductors at locations corresponding to those specifically illustrated in Fig. 1, Fig. 2 and Fig. 3.

Usually the grid of a battery plate not only serves as a support for the active material required for the operation of the battery, but also serves as a mechanical support for holding the plates in their proper place. Consequently, the grids ordinarily have at least two distinct zones to accomplish these functions with the major mass of the metal of the grid used for mechanical support being uncoated with active material. In contradistinction, the present invention is directed to a storage battery plate wherein the grid functions primarily as an electrical conductor which is so distributed throughout the interior of the plate to accomplish this primary function. Although these conductors which make up the grid will incidentally give some mechanical support, the major portion of the mechanical support is obtained by other means as will be indicated below. The grid may be formed from individual conducting elements such as lead alloy wires, or cast as a unit with equivalent characteristics insofar as the conducting electric current is concerned. When cast as a unit, the cross-section of at least a portion of the grid as it approaches the terminal, will increase since the current density of the grid elements is the greatest near the terminal and tapers off toward the more distant parts of the plates. Although the individual elements or members of the grid, or their equivalents when the grid is cast as a unit, do not primarily serve as a mechanical support, these elements or units, arranged at least in part horizontally, provide some support, particularly in combination with the united fabric which covers active material around the elements.

The conducting elements of the grid may for the most part be spaced vertically in the plate, arranged radially from an upper corner of the plate from which the terminal extends, or be arranged horizontally within the plate. For mechanical reasons it may be preferred that adjacent pairs of conducting elements in any such arrangement be a unit in the form of a loop and, more particularly, it may be desirable to have a combination of horizontally looped, conducting elements and at least one vertically looped, conducting element such as shown in Fig. 1.

All the conducting elements of the grid, except the upper tip of the terminal, are covered with active material required for the operation of the battery—usually lead peroxide for the positive plate and sponge lead for the negative plate, the combination of active materials required with the usual sulfuric acid electrolyte.

The active material covering all but the exposed terminal tip of the grid is covered with a porous, electrolyte resistant fabric, and the fabric on each side of the plate is united around the plate and between adjacent, conducting elements of the grid, thereby forming a continuous, interconnected grid chamber enclosing the grid and the active material supported thereon. By so uniting this very close meshed fabric, all of the active material of the plate is entirely enclosed, thereby preventing the movement of any separated particles from their predetermined positions. In contradistinction to constructions hitherto proposed, there is no uniting of fabric around any exposed part of the grid at or near the bottom of the plate. The fabric on opposite sides of the plate may be closely united as shown in Fig. 2, or may be united in such a manner as to produce a plate of substantially uniform thickness and more resistant to compression as shown in Fig. 3. The only closure of this character is near the top of the terminal portion of the grid so that no oxide material can fall from the plate through such closure if the fabric is not securely united and, in any event, the closure may be sealed in addition to the method of uniting the fabric in and around other portions of the plate, such as by sewing. The fabric covering of the plate serves as a separator between adjacent plates, but conventional separators may be added to give an additional factor of safety electrically and to facilitate circulation of electrolyte.

The fabric used to cover all of the elements of the storage battery plate which are submerged in the electrolyte is constructed of electrolyte resistant, dielectric material woven of such a close mesh as to act as a container for the paste of the active material on the grid sufficiently strong to act as an essential part of the mechanical structure of each complete plate but at the same time sufficiently porous to permit circulation of the electrolyte from outside the plate through the fabric to contact the active material of the plate. Fabrics made of any material which meets these requirements are satisfactory for the construction of the plate of the present invention. Fabrics made of borosilicate glass (Pyrex) fibers have been found particularly suitable for this purpose. There are undoubtedly fabrics made of other material which will have the proper chemical and physical characteristics to perform under the conditions of operation of the plate. However, the fabric per se is not alone the subject matter of the present invention which is a novel combination of elements, some of which are old.

An assembly of plates may be supported by ridges or electrically insulated strips across the bottom of the jar, or they may be supported by providing holes through the extension of the fabric beyond the active zone and the plate proper through which are threaded glass or other insulating rods for supporting the plates vertically in the container. Wedges or other bracing may be inserted between the group of plates and the interior of the case or jar to obtain sufficient rigidity against rough handling and severe service. Batteries containing an assembly of plates constructed in accordance with the present invention, having shown an increased capacity of 30 per cent over other batteries of the same weight, make such a battery particularly advantageous for installation in portable devices, in aircraft, or for furnishing power propulsion for vehicles, boats and other self-propellent equipment.

It will be seen therefore that this invention actually may be carried out by the use of various modifications and changes without departing from its spirit and scope.

I claim:

1. An improved storage battery plate consisting of, in combination, a terminal; a terminal header integral therewith; a plurality of thin, flexible singly looped conducting members integral with said terminal header disposed to lie substantially in a plane and, in combination with said terminal header, to form an interconnected grid; active material disposed on and around said conducting elements and terminal header; and a porous, electrolyte-resistant, dielectric fabric disposed over the lateral surfaces of active material on and around said conducting members and terminal header united around each element of the grid to form a continuous, interconnected grid chamber enclosing the grid and active material thereon and performing the major portion of the mechanical support of said active material.

2. In a storage battery plate, comprising a terminal, a terminal header, an interconnected grid and active material disposed on and around elements of said grid, adapted to be immersed in a solution of electrolyte to a level near said terminal, that improved construction which comprises in combination a terminal; a single terminal header integral therewith; a plurality of thin, flexible singly looped conducting members integral with said terminal header disposed to lie substantially in a vertical plane and in combination with said terminal header to form an interconnected grid; active material disposed on and around each of said looped conducting members and on and around said terminal header to a level above that to which it is adapted to be immersed in electrolyte solution; and a porous, electrolyte-resistant, dielectric fabric disposed over the lateral surfaces of active material, on and around said conducting members and terminal header, united around each element of the grid to form a continuous, interconnected grid chamber enclosing the grid and active material thereon and performing the major portion of the mechanical support of said active material.

3. In a storage battery plate, comprising a terminal, a terminal header, an interconnected grid and active material disposed on and around elements of said grid, adapted to be immersed in a solution of electrolyte to a level near said terminal, that improved construction which comprises in combination a terminal; a single terminal header integral therewith; a plurality of thin, flexible singly looped conducting members integral with said terminal header disposed to lie substantially in a plane and in combination with said terminal header to form an interconnected grid; active material disposed on and around each of said looped conducting members and on and around said terminal header to a level above that to which it is adapted to be immersed in electrolyte solution; and a porous, electrolyte-resistant, dielectric fabric disposed over the lateral surfaces of active material, on and around said conducting members and terminal header, closely united around each element of the grid by sewing to form a continuous, interconnected grid chamber enclosing the grid and active material thereon and performing the major portion of the mechanical support of said active material.

4. In a storage battery plate, comprising a terminal, a terminal header, an interconnected grid and active material disposed on and around elements of said grid, adapted to be immersed in a solution of electrolyte to a level near said terminal, that improved construction which comprises in combination a terminal; a single terminal header integral therewith, at least a portion thereof increasing in cross section as it approaches the terminal; a plurality of thin, flexible singly looped conducting members integral with said terminal header disposed to lie substantially in a plane and in combination with said terminal header to form an interconnected grid; active material disposed on and around each of said looped conducting members and on and around said terminal header to a level above that to which it is adapted to be immersed in electrolyte solution; and a porous, electrolyte-resistant, dielectric fabric disposed over the lateral surfaces of active material, on and around said conducting members and terminal header, united by many lateral threads between each element of the grid to form a continuous, interconnected grid chamber enclosing the grid and active material thereon and performing the major portion of the mechanical support of said active material.

5. In a storage battery plate, comprising a terminal, a terminal header, an interconnected grid and active material disposed on and around elements of said grid, adapted to be immersed in a solution of electrolyte to a level near said terminal, that improved construction which comprises in combination a terminal; a single terminal header integral therewith, at least a portion thereof increasing a cross section as it approaches the terminal; a plurality of thin, flexible singly looped conducting members integral with said terminal header disposed to lie substantially in a verticle plane and in combination with said terminal header to form an interconnected grid; active material disposed on and around each of said looped conducting members and on and around said terminal header to a level above that to which it is adapted to be immersed in electrolyte solution; and a porous, electrolyte-resistant, dielectric fabric made of fibers of borosilicate glass disposed over the lateral surfaces of active material, on and around said conducting members and terminal header, united around each element of the grid to form a continuous, interconnected grid chamber enclosing the grid and active material thereon and performing the major portion of the mechanical support of said active material.

LLEWELLYN EVANS.

REFERENCES CITED

The following references are of record in the file of this patent:

UNITED STATES PATENTS

| Number | Name | Date |
| --- | --- | --- |
| 393,576 | Paget | Nov. 27, 1888 |
| 502,824 | Morse | Aug. 8, 1893 |
| 628,492 | Ridsdale | July 11, 1899 |
| 749,855 | Feldkamp | Jan. 19, 1904 |
| 760,897 | Meygret | May 24, 1904 |
| 1,408,579 | Garrett et al. | Mar. 7, 1922 |
| 2,266,546 | Galloway | Dec. 16, 1941 |
| 2,318,498 | Keen | May 4, 1943 |
| 2,343,970 | Galloway | Mar. 14, 1944 |
| 2,350,752 | Graf | June 6, 1944 |